(12) United States Patent
Stidham

(10) Patent No.: US 12,498,778 B1
(45) Date of Patent: Dec. 16, 2025

(54) PORTABLE ELECTRONIC DEVICE WITH EMERGENCY MODE FOR LOW BATTERY USAGE AND METHOD FOR USING THE SAME

(71) Applicant: Ryan Stidham, Independence, KY (US)

(72) Inventor: Ryan Stidham, Independence, KY (US)

( * ) Notice: Subject to any disclaimer, the term of this patent is extended or adjusted under 35 U.S.C. 154(b) by 0 days.

(21) Appl. No.: 19/186,154

(22) Filed: Apr. 22, 2025

(51) Int. Cl.
*G06F 1/32* (2019.01)
*G06F 1/3212* (2019.01)

(52) U.S. Cl.
CPC .................................. *G06F 1/3212* (2013.01)

(58) Field of Classification Search
CPC ................. G06F 1/32; G06F 9/44; G06F 1/12
See application file for complete search history.

(56) References Cited

U.S. PATENT DOCUMENTS

| | | | |
|---|---|---|---|
| 5,454,710 A | 10/1995 | Landau et al. | |
| 5,549,984 A | 8/1996 | Dougherty | |
| 6,668,179 B2 | 12/2003 | Jiang | |
| 6,879,259 B1 * | 4/2005 | Smith | G06F 1/28 702/6 |
| 8,862,092 B2 | 10/2014 | Reitnour | |
| 9,430,021 B2 | 8/2016 | Lu et al. | |
| 9,615,333 B2 | 4/2017 | Brown et al. | |
| 10,228,751 B2 * | 3/2019 | Andrews | G06F 1/3296 |
| 10,613,608 B2 | 4/2020 | Graham et al. | |
| 2002/0077159 A1 * | 6/2002 | Jiang | H04W 52/0277 455/574 |
| 2006/0143365 A1 * | 6/2006 | Kikuchi | G06F 3/0614 711/202 |
| 2007/0004466 A1 * | 1/2007 | Haartsen | H04W 52/0261 455/572 |
| 2009/0149153 A1 * | 6/2009 | Lee | H04M 1/72424 455/574 |
| 2011/0230161 A1 | 9/2011 | Newman | |
| 2016/0307007 A1 * | 10/2016 | Narasimha | H04W 12/06 |
| 2018/0184360 A1 * | 6/2018 | Cavalcanti | H04W 40/24 |

* cited by examiner

*Primary Examiner* — Keshab R Pandey
(74) *Attorney, Agent, or Firm* — Frost Brown Todd LLP

(57) ABSTRACT

A portable electronic device includes a battery reserve feature for emergency use, reserving a portion of battery power when a predefined threshold is reached. A battery detector monitors the real-time battery level, sending data to a host controller that compares it to the threshold stored in non-transitory memory. Upon reaching the threshold, a masking module signals a depleted battery state to the operating system, disabling regular functions while a display shows a "no power" message, concealing the reserve. User interaction, such as pressing a designated button, activates an emergency subsystem to perform operations like initiating emergency calls, sending GPS coordinates, capturing screenshots, or activating alarms, using the reserved power. The threshold may be dynamically adjusted based on environmental or location-based factors.

19 Claims, 7 Drawing Sheets

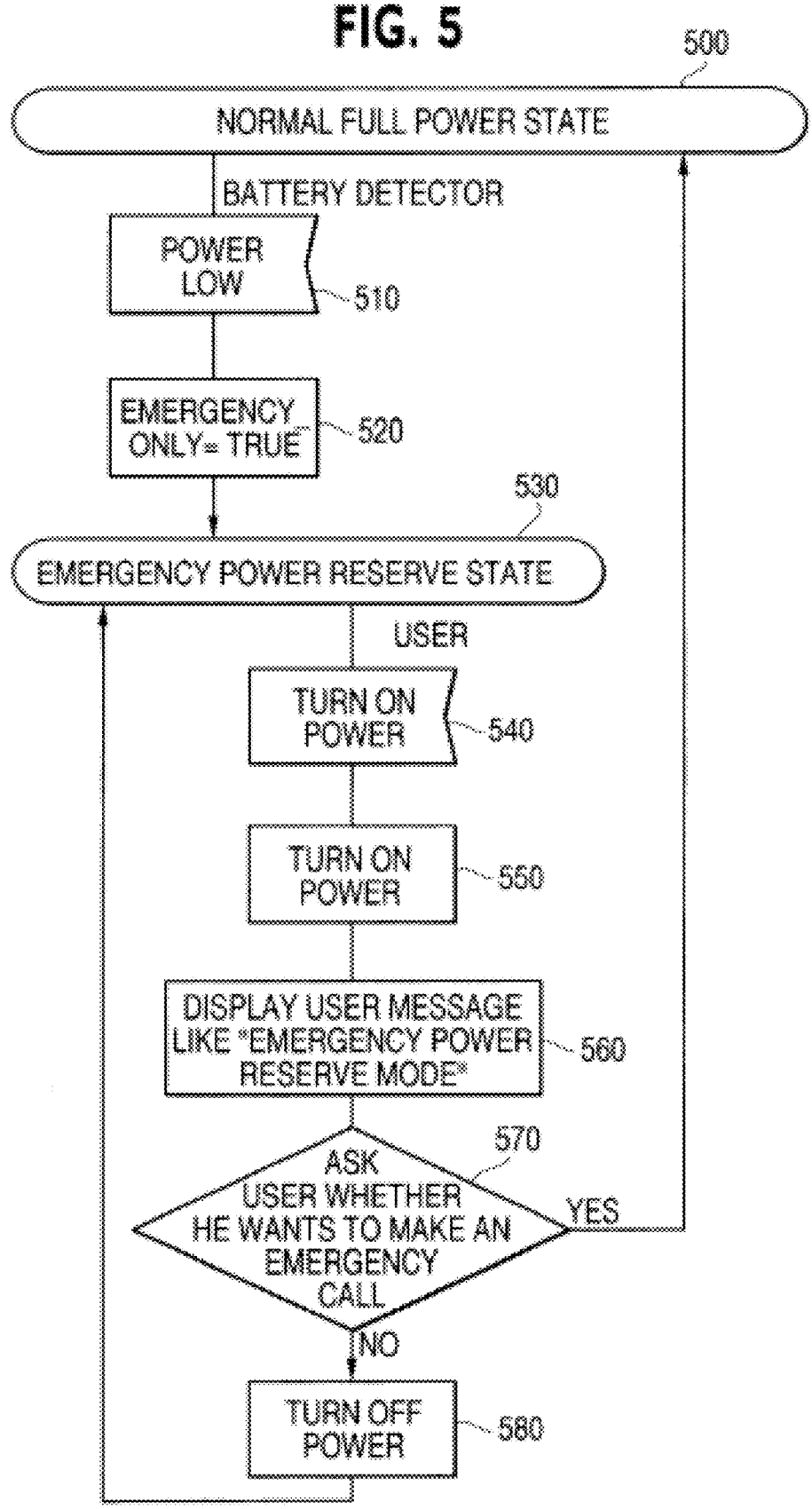

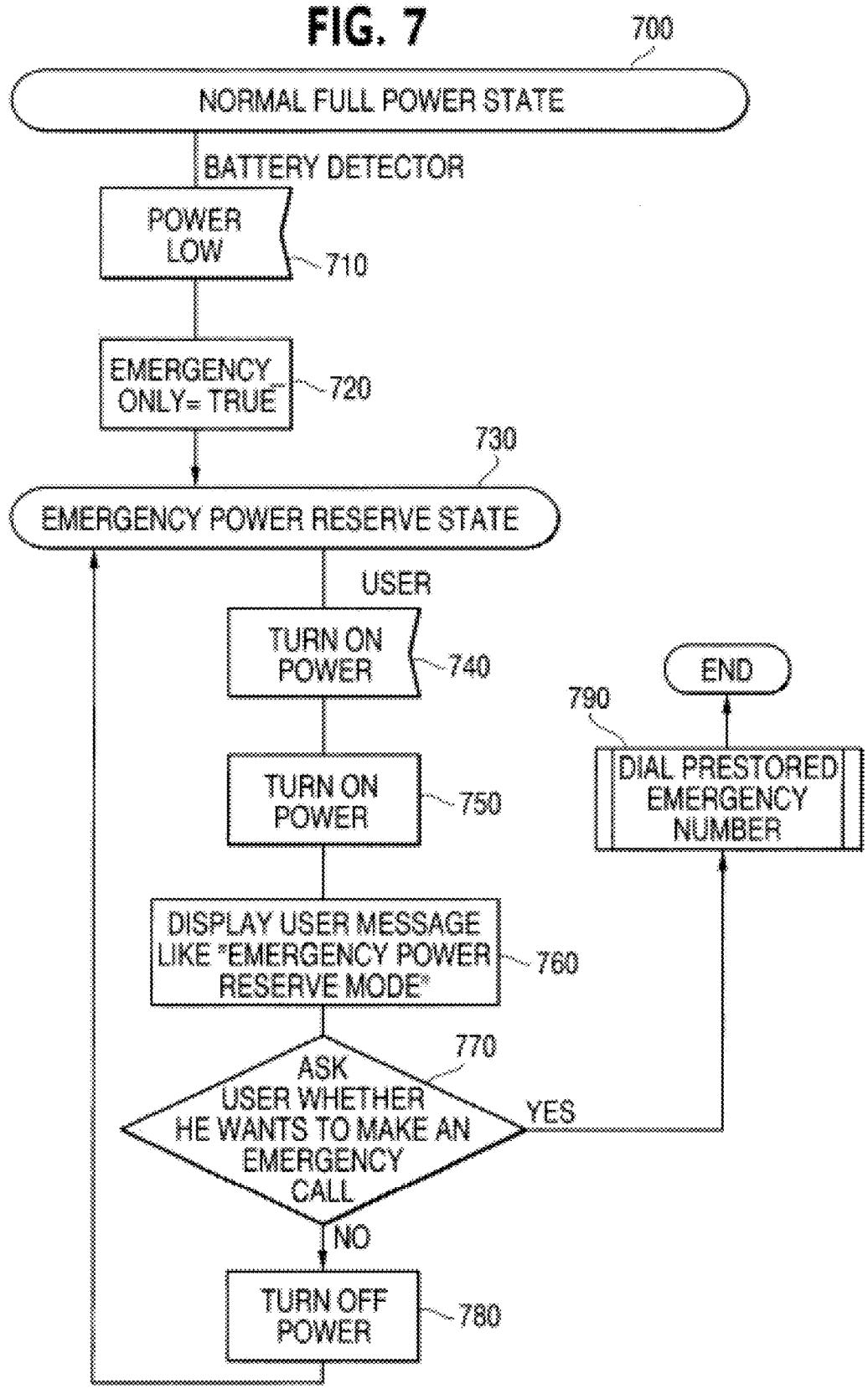

PORTABLE ELECTRONIC DEVICE WITH EMERGENCY MODE FOR LOW BATTERY USAGE AND METHOD FOR USING THE SAME

FIELD OF THE INVENTION

The present invention relates to portable electronic devices such as cellular or mobile telephones which utilize batteries, and more particularly, relates to methods and apparatus for the management of the batteries of such portable electronic devices.

BACKGROUND OF THE INVENTION

Portable electronic devices such as wireless terminal devices, also known as cellular or mobile telephones, are ubiquitous in modern society. Cellular or mobile telephones are becoming more portable and easier to use all the time, and customers (users) are now relying daily on the availability of these cellular or mobile telephones to accommodate their communication needs. These cellular telephones are typically driven by batteries of different battery storage capacities, often based on sizes and battery technologies. Therefore the challenges for these cellular telephones are to manage the battery power efficiently and to extend the battery life as long as possible both in the talk (transmit) mode and standby (idle) mode.

Many advanced wireless systems incorporate battery power management features which not only conserve battery power by minimizing mobile system processing, particularly during the standby mode, but also allow the user to gauge the remaining battery life and alert the user to the run-down of a battery with either an audible alert message or a vibration for subsequent recharge operations Either situation however, when the battery is run-down (dead), the user has no choice but to recharge the battery before usage. For many cellular telephones, the battery may last only 1 to 2 hours of talk time when used in the cellular system. As a result, the user is often left with a useless cellular telephone without any battery power in cases of emergency situations when such a cellular telephone is needed most.

Therefore, there is a strong need for an inexpensive, more effective and efficient avenue to ensure that a portable electronic device such as a cellular telephone is always available for use in cases of emergency, and that the user always has access to such a cellular telephone in cases of emergency regardless of the conditions of its battery.

BRIEF DESCRIPTION OF THE DRAWINGS

FIG. 5 presents a software diagram of the host controller's operation, detailing transitions between normal and emergency power reserve states with user-selected emergency actions.

FIG. 6 illustrates example displays of a portable electronic device, where

FIG. 7 illustrates a software diagram of the host controller's operation, similar to FIG. 5, but with automatic emergency action execution, such as dialing a pre-stored number.

DETAILED DESCRIPTION OF THE INVENTION

The present invention is applicable for use with all types of portable electronic devices and wireless terminal devices which utilize batteries for data communications. Examples of such portable electronic devices and wireless terminal devices may include both analog and digital mobile or cellular phones, pagers, wireless portable digital assistants (PDAs), and other portable consumer electronics. However, for the sake of simplicity, discussions will concentrate mainly on mobile or cellular phones using batteries, although the scope of the present invention is not limited thereto.

Conventional portable electronic devices often include power-saving modes triggered at low battery levels to extend operational time. However, these modes typically do not reserve energy explicitly for emergency usage nor prevent users from consuming all available power, leaving devices inoperable in critical situations. The present invention addresses this limitation by introducing a concealed battery reserve feature, which ensures a portion of battery power remains available exclusively for emergency operations, even when the device appears fully drained.

Figure 1:
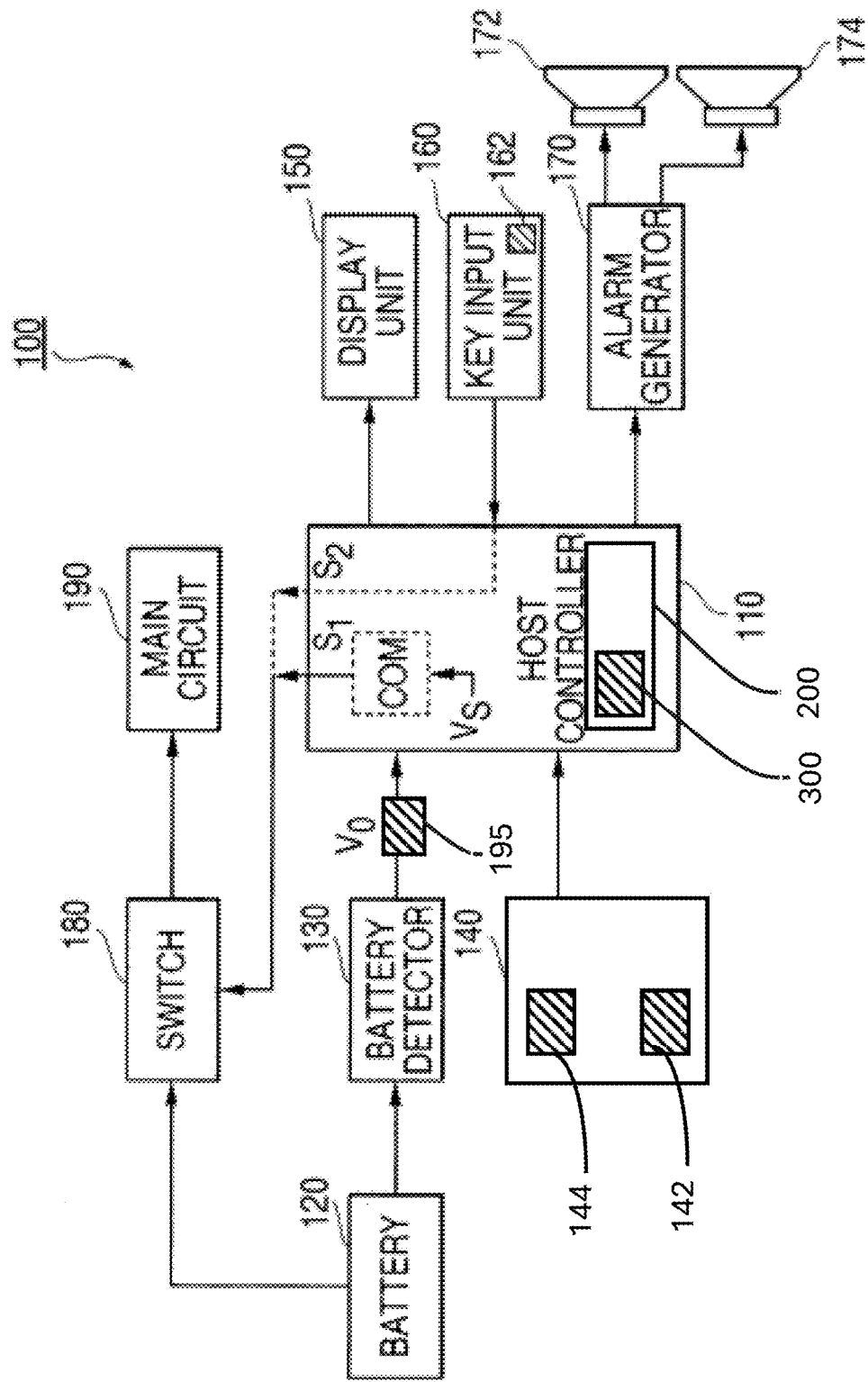
FIG. 1 illustrates a block diagram of a portable electronic device, such as a cellular telephone, with a battery reserve feature for emergency use, showing component interactions.

Attention now is directed to the drawings and particularly to FIG. 1, in which a portable electronic device such as a cellular telephone having a battery reserve feature for emergency use according to an embodiment of the present invention is illustrated. The battery reserve feature advantageously reserves a portion, for example, 20%, of the battery to be used only for emergency situations, masking the real battery percentage to display 0% when the reserve threshold is reached. This ensures the cellular phone always has sufficient battery power to make emergency calls or perform other emergency operations, even when the battery appears depleted for all other purposes (i.e., regular calls). The emergency numbers include, for example, an emergency 911 number linked to a public 911 emergency system utilized to identify the location of the cellular telephone, and any other pre-stored emergency numbers that the user deems appropriate for emergency use. These emergency numbers may be set or reset by a user from a user menu provided on a display. The battery used in such a cellular telephone may include, for example, Alkaline, Nickel Cadmium (NiCD), Nickel Metal Hydride (NiMH), Lithium Ion (Li-Ion), and Zinc Air. Each of these batteries has a battery storage capacity that varies depending on its size and battery technology. Therefore, the battery reserve feature of such a cellular telephone may require adjustments for low battery indications depending on the battery used.

As shown in FIG. 1, the cellular telephone 100 may comprise a host controller 110, a battery 120, a battery detector 130, a memory 140, a display unit 150, a key input unit 160, an alarm generator 170, a switch 180, a main circuit 190, a masking module 195, a main operating system 200, and an emergency subsystem 300 arranged to control operations of the cellular telephone 100.

Host controller 110 is arranged to interact with the battery detector 130, the memory 140, the display unit 150, the key input unit 160, the alarm generator 170, the switch 180, the main circuit 190, the masking module 195, the main operating system 200, and the emergency subsystem 300, and to support the main circuit 190 in controlling operations of the cellular telephone 100, particularly the battery reserve feature for emergency use according to an embodiment of the present invention. The host controller 110 further manages transitions between a normal operating mode and a dedicated emergency mode, preventing access to the reserved battery power during regular operations, enabling access to the reserved battery power for emergency operations, initiating an emergency mode upon user request via a specific interaction, and ensuring that the reserved battery portion is used solely for emergency operations. The host controller 110 is further configured to disable all non-essential device functions while emergency mode is active and prevents the main operating system 200 from accessing the reserved battery capacity during standard operation.

Battery 120, as previously discussed, may be one of an Alkaline, Nickel Cadmium (NiCD), Nickel Metal Hydride (NiMH), Lithium Ion (Li-Ion), or Zinc Air type of battery, and has a battery storage capacity that varies depending on its size and battery technology. Such a battery 120 may be removable from the cellular telephone 100 for either replacement or recharging purposes.

Battery detector 130 is connected to the battery 120 to detect the battery power (e.g., voltage or current) of the battery 120 as a power source of the cellular telephone 100 and produce battery power information Vd indicating the detected real-time battery level in either an analog or digital form.

Memory 140 may contain a program storage area 142 and a data storage area 144. The program storage area 142 may include a Read-Only-Memory (ROM) for storing software for the main operating system 200 and application software including the battery reserve feature for emergency use according to an embodiment of the present invention. The data storage area 144 may include a Random-Access-Memory (RAM), implemented as a non-transitory memory, which serves as a working memory for storing relevant data, including power (e.g., voltage or current) setting information VS, also referred to as a predefined reserve threshold, for designating a battery power value at which an alarm is given, informing that the battery power information Vd indicating the detected real-time battery level approaches the lowest usable voltage or current (e.g., 20% of the battery power) of the battery 120. The non-transitory memory is further configured to store a set of preconfigured emergency contacts, such as telephone numbers for emergency services or user-designated contacts, accessible only during the emergency mode to ensure secure and prioritized communication. Such power setting information VS serves as a reference for the battery power information Vd and may be set and varied by the user via the key input unit 160. In an alternative embodiment, the power setting VS may be preset by a third party, such as a service provider, or by the manufacturer, to ensure a standardized emergency reserve tailored to the device's specifications or regional requirements, and stored in the memory 140 as a fixed value inaccessible to user modification. Additionally, the power setting VS may be updated remotely by a third party, including those designated as emergency contacts, via secure network communication to adjust the reserve threshold based on specific needs or conditions, such as increased emergency requirements in high-risk scenarios. Furthermore, in another embodiment, the power setting VS may dynamically fluctuate based on usage patterns or external conditions, such as environmental factors like temperature or weather, which can affect expected battery life, requiring an increase in VS to ensure sufficient power remains for emergency operations; additionally, VS may adjust upward if the user is in a dangerous or remote area, as determined by GPS or network data, where emergency operations are more critical or require greater lead time to be effective. The memory 140 may also be permanently incorporated into the host controller 110.

Display unit 150 may be a Liquid Crystal Display (LCD) for providing a visual display of visible information such as letters, symbols, or the like necessary for the user to operate the cellular telephone 100, including using the battery reserve feature for emergency use according to an embodiment of the present invention. When the battery power information Vd reaches the power setting VS, the display unit 150 is configured to show a "no power" message or a blank screen, misleading the user into believing the phone is completely dead, while in reality, it retains sufficient power for emergency calls or other emergency operations, thereby safeguarding this reserve from unnecessary use.

The masking module 195 is configured to interface between the battery detector 130 and the main operating system 200, transmitting a modified battery level value to the main operating system 200 when the battery power information Vd reaches the power setting VS, such that the main operating system 200 receives a masked battery value indicating full depletion, prompting a shutdown or inoperable state for regular functions. The masking operation may be performed at the firmware or bootloader level, independent of the main operating system 200, to ensure robustness and security of the reserve.

Key input unit 160 may include a number of keys corresponding to alphabets/numbers for the user to input relevant data, and other well-known function keys. This unit enables the user to interact with the cellular telephone 100, including setting emergency numbers and power thresholds (where permitted), and initiating emergency calls or operations when the battery power reaches the reserve level. A specific physical interaction, such as pressing a designated button, may activate the emergency subsystem 300, triggering an emergency mode.

Alarm generator 170 may include a speaker 172 and a buzzer 174 for sounding an alarm or a vibration to alert the user of low battery power when the battery power information Vd indicating the detected power value from the battery detector 130 approaches the power setting information VS of the battery 120.

Switch 180 is arranged to operate to either permit or stop the feed of battery power from the battery 120 to the main circuit 190 of the cellular telephone 100, upon receipt of a switch control signal S1 from the host controller 110 or a switch control signal S2 from the key input unit 160, via the host controller 110.

The main circuit 190 includes the emergency subsystem 300, which may operate under a micro-OS or firmware independent of the main operating system 200. The emergency subsystem 300 enables basic emergency operations, including initiating an emergency call to a preconfigured contact (e.g., 911), sending current GPS location to designated emergency contacts, taking a screenshot of the phone display (e.g., to capture critical information), sending a pre-recorded distress message, activating a loud alarm through the speaker 172 to attract attention from nearby individuals in a crisis, or launching a low-power communication protocol for emergency alerts, allowing access to emergency functionalities using the reserved battery capacity.

The main operating system 200 manages regular operations of the cellular telephone 100, including user interface functions, application execution, and communication protocols during normal mode. When the masking module 195 signals a 0% battery level, the main operating system 200 shuts down or disables non-essential functions, preserving the reserved battery power for the emergency subsystem 300.

The host controller 110 may include a comparator 112 arranged to make a comparison between the battery power information Vd indicating the detected power value from the battery detector 130 and the power setting information VS set by the user (or a third party/manufacturer, or dynamically adjusted in the alternative embodiments), and generate a low battery indication signal when the battery power information Vd reaches the power setting VS. Then the alarm generator 170 may, in response to the low battery indication signal, alert the user of such a low battery indication by either blipping, via the speaker 172, or a number of vibrations, via the buzzer 174.

The display unit 150 and the key input unit 160 may also serve as input/output means for various types of information associated with call originating and call incoming, which are functions inherent in the cellular telephone. The construction and function of the other components of the cellular telephone are feasible using well-known techniques, and hence, the explanation thereof will be omitted.

Figure 2:
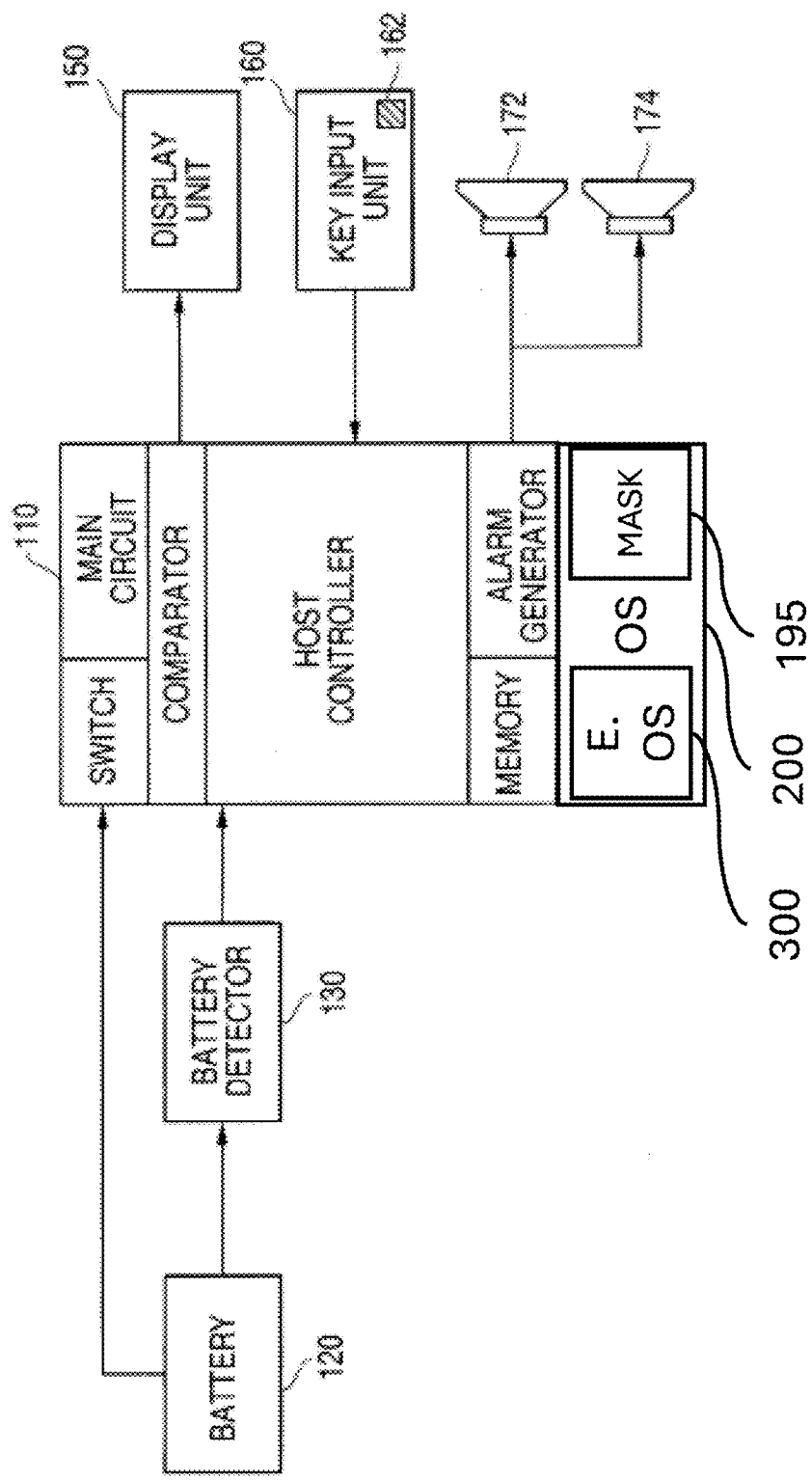
FIG. 2 depicts an alternative block diagram of a portable electronic device with integrated components for the battery reserve feature, emphasizing host controller functionality.

FIG. 2 illustrates an example block diagram of a portable electronic device such as a cellular telephone having the battery reserve feature for emergency use according to another embodiment of the present invention. As shown in FIG. 2, the memory 140, the alarm generator 170, the switch 180, the main circuit 190, the masking module 195, the main operating system 200, and the emergency subsystem 300 may be integrated into the host controller 110 such that the host controller 110 is now configured to control all operations of the cellular telephone 100, including the use of the battery reserve feature for emergency use according to an embodiment of the present invention. For example, application software written specifically for controlling the power supply from the battery 120, including the use of the battery reserve feature, may be downloaded into the main operating system 200 of the host controller 110 via the Internet or from a tangible medium, such as a floppy disk or a compact disk (CD) ROM, or may also be bundled with the main operating system 200 which may be activated by first battery power. Additionally, the application software may receive over-the-air (OTA) patches to update the battery reserve feature, ensuring compatibility with evolving network standards and enhancing functionality through secure wireless updates. Alternatively, the application software may also be available as a firmware module or a comprehensive hardware/software module which may be built into the host controller 110 to control all operations of the cellular telephone 100.

Figure 3:
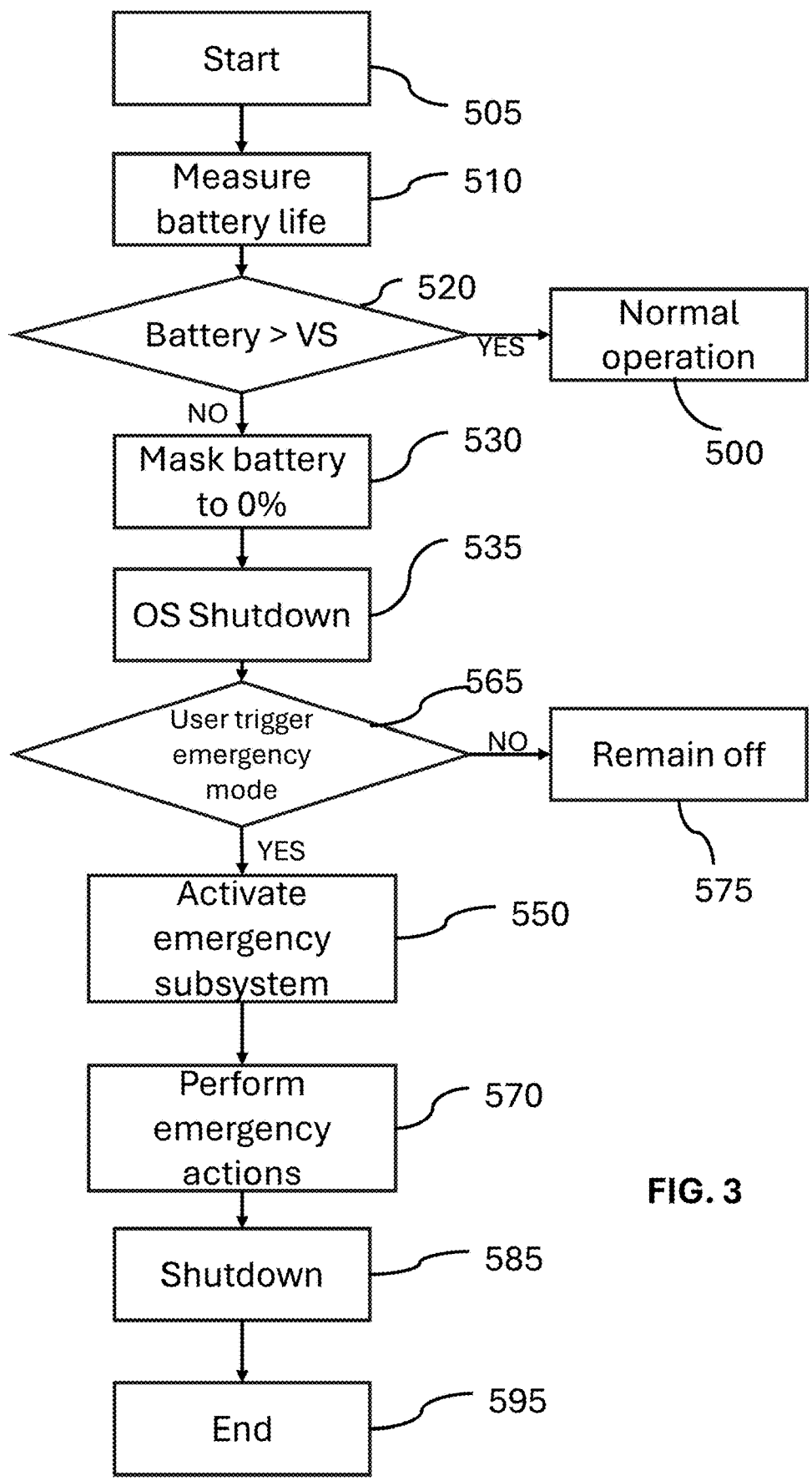
FIG. 3 presents a flowchart of the emergency activation process, outlining steps from battery level measurement to emergency operation execution or device shutdown.

FIG. 3 illustrates a flowchart of the emergency activation process for a portable electronic device, such as a cellular telephone, implementing the battery reserve feature according to an embodiment of the present invention. As shown in FIG. 3, the process commences at block 505. The battery detector 130 measures the real-time battery level at block 510, producing battery power information Vd. The host controller 110 compares Vd to the predefined reserve threshold VS, stored in the non-transitory memory 140, at block 520. The VS value may be pre-set by a third party or manufacturer, user-adjusted, or dynamically adjusted based on environmental factors, such as temperature or weather conditions affecting battery life, or location-based risk assessments using GPS or network data indicating a remote or high-risk area. If Vd exceeds VS, the device operates normally at block 500, with the main operating system 200 managing regular functions like calls, applications, and communications, and loops back to block 510 for continuous monitoring. If Vd is at or below VS, the masking module 195, at block 530, masks the real-time battery level by transmitting a masked battery value indicating full depletion to the main operating system 200, which, at block 535, shuts down or disables all non-essential device functions, preventing access to the reserved battery power during regular operations. Simultaneously, the display unit 150 displays a "no power" message or blank screen, creating the appearance of a fully depleted device while safeguarding the reserved battery capacity. At block 565, the host controller 110 monitors for a user interaction to trigger emergency mode, such as a specific physical interaction detected by the key input unit 160, typically pressing a designated button. If no interaction is detected, the device remains off at block 575, conserving power, and the process terminates at block 595. If the user triggers emergency mode, the host controller 110, at block 550, initiates the emergency mode upon user request by activating the emergency subsystem 300, enabling access to the reserved battery power for emergency operations. At block 570, the emergency subsystem 300 executes emergency operations, accessing preconfigured emergency contacts stored in the memory 140 to perform actions such as initiating an emergency call, sending GPS coordinates, capturing a screenshot of the display unit 150 to record critical information, sending a distress message, activating a loud alarm to attract attention, or launching a low-power communication protocol. Following these operations, the host controller 110 shuts down the device at block 585 to conserve any remaining power, concluding the process at block 595.

Figure 4:
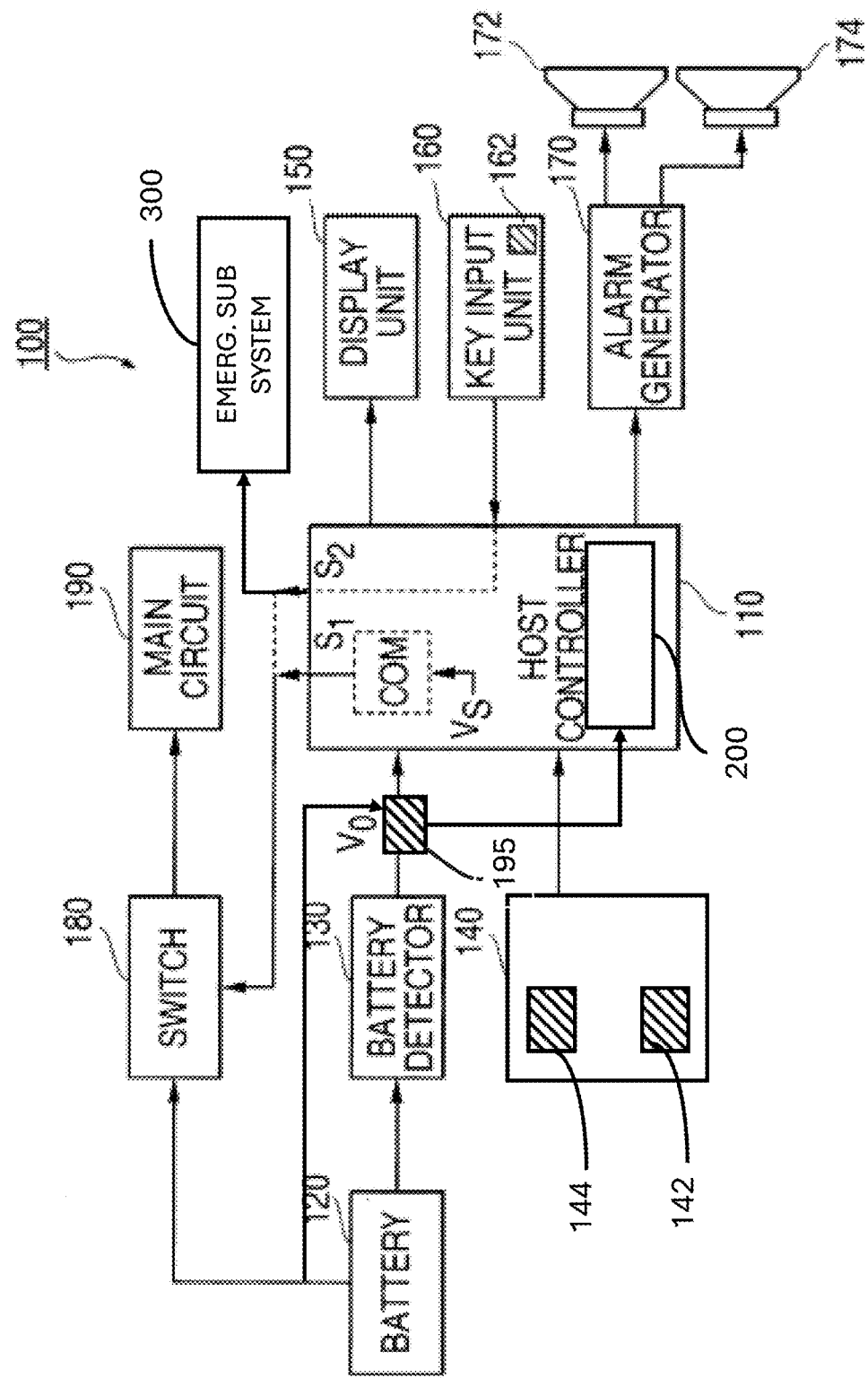
FIG. 4 illustrates a system architecture diagram of a portable electronic device, detailing the data flow for battery level monitoring, masking, and emergency operation activation.

FIG. 4 illustrates a functional diagram of the host controller's process for monitoring battery levels and disabling regular operations when the reserve threshold is reached according to an embodiment of the present invention. As shown in FIG. 4, the host controller 110 may be configured to (constantly or intermittently) monitor and detect a low battery indication when the battery power information Vd indicating the detected power value from the battery detector 130 reaches the power setting information VS at block 310, alert the user of such a low battery indication by either blipping, via the speaker 172, or a number of vibrations, via the buzzer 174 at block 320, and then automatically disconnect the battery supply from the battery 120 to the main circuit 190 so as to disable operation of the cellular telephone 100 for purposes of making regular telephone calls at block 330.

FIG. 5 illustrates a software diagram of a host controller 110 having the battery reserve feature for emergency use according to an embodiment of the present invention. The application software described may be written specifically for controlling the power supply from the battery 120, including the use of the battery reserve feature for emergency use according to an embodiment of the present invention. The host controller 110 allows the cellular telephone 100 to operate between a Normal Full Power State at block 500 and an Emergency Power Reserve State for making only emergency calls or performing emergency operations after the battery 120 has reached the power setting VS for purposes of making regular telephone calls.

As shown in FIG. 5, the host controller 110 maintains the cellular telephone 100 in a Normal Full Power State at block 500. The battery power level is measured at block 510, and when the battery power is low—that is, when the battery power information Vd indicating the detected power value from the battery detector 130 is compared to the power setting information VS at block 520 and found to be at or below VS—the software of the host controller 110 masks the battery level to 0% at block 530, sets an emergency_only flag to TRUE at block 540, and switches the Normal Full Power State to an Emergency Power Reserve State at block 545, indicating that the cellular telephone 100 is out of battery as shown in FIG. 6A. At this point, the masking module 195 signals a 0% battery level to the main operating system 200, and the display unit 150 shows a "no power" message or blank screen to conceal the reserved power. Once the cellular telephone 100 is in an Emergency Power Reserve Mode, only emergency telephone calls or operations are permitted. The host controller 110 waits for the user to turn on the cellular telephone 100 or engage a specific physical interaction (e.g., pressing a designated button) at block 560. After the user has activated the emergency mode, the host controller 110 activates the power supply from the battery 120 to the emergency subsystem 300 at block 550 and provides a visual display of a user message such as "Emergency Power Reserve Mode" to alert the user that the cellular telephone 100 is in an Emergency Power Reserve Mode. Next, the host controller 110 provides a visual display asking the user whether they want to make an emergency call or perform another emergency operation as shown in FIG. 6B, at block 570. If the user does not want to proceed, the host controller 110 automatically shuts off the power supply from the battery 120 at block 580 and returns to the Emergency Power Reserve State at block 545. However, if the user desires to make an emergency call or perform an emergency operation at block 570, the host controller 110 enables the emergency subsystem 300 to execute the selected emergency function as shown in FIG. 6C, returning to the operational state for emergency functions at block 500.

Figure 6C:
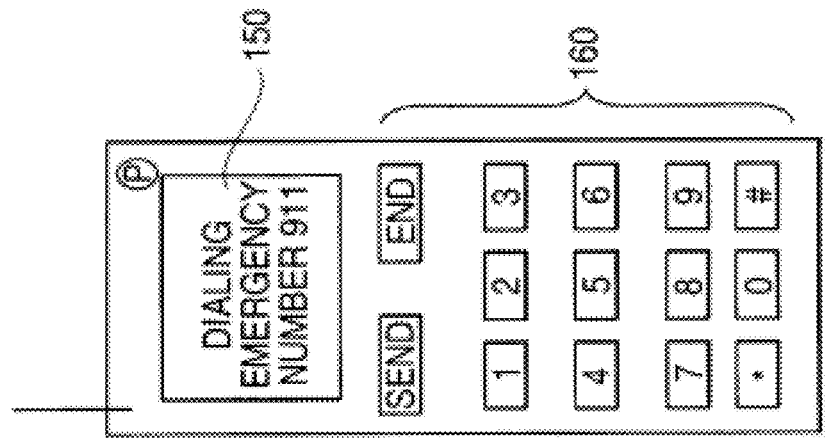
FIG. 6C depicts a display during the execution of a selected emergency function.
Figure 6B:
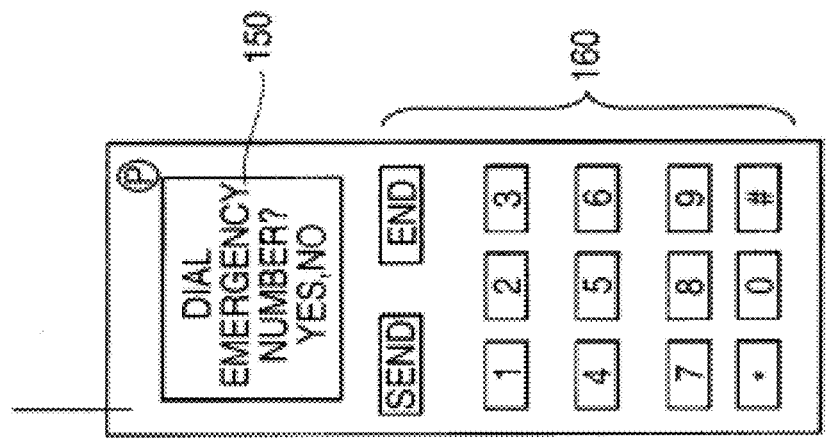
FIG. 6B shows a display prompting the user to select an emergency action.
Figure 6A:
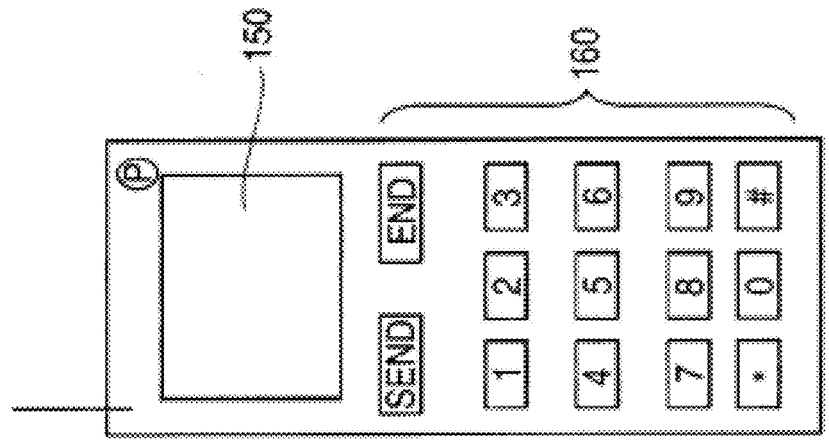
FIG. 6A shows a display indicating the device is out of battery in emergency power reserve mode.

FIG. 6 illustrates example displays of a portable electronic device, such as a cellular telephone, implementing the battery reserve feature for emergency use according to an embodiment of the present invention. FIG. 6A illustrates a display indicating the device is out of battery in emergency power reserve mode, showing a "no power" message or blank screen. FIG. 6B shows a display prompting the user to select an emergency action, such as making an emergency call or performing another operation. FIG. 6C depicts a display during the execution of a selected emergency function, such as an ongoing emergency call or data transmission.

FIG. 7 illustrates a software diagram of a host controller 110 having the battery reserve feature for emergency use according to another embodiment of the present invention, differing from FIG. 5 by enabling automatic execution of an emergency action. The application software described may be written specifically for controlling the power supply from the battery 120, including the use of the battery reserve feature for emergency use according to an embodiment of the present invention. The host controller 110 allows the cellular telephone 100 to operate between a Normal Full Power State at block 700 and an Emergency Power Reserve State for making only emergency calls or performing emergency operations after the battery 120 has reached the power setting VS for purposes of making regular telephone calls. As shown in FIG. 7, the host controller 110 maintains the cellular telephone 100 in a Normal Full Power State at block 700. The battery power level is measured at block 710, and when the battery power is low—that is, when the battery power information Vd indicating the detected power value from the battery detector 130 is compared to the power setting information VS at block 720 and found to be at or below VS—the software of the host controller 110 masks the battery level to 0% at block 730, sets an emergency_only flag to TRUE at block 740, and switches the Normal Full Power State to an Emergency Power Reserve State at block 730, indicating that the cellular telephone 100 is out of battery as shown in FIG. 6A. The masking module 195 signals a 0% battery level to the main operating system 200, and the display unit 150 shows a "no power" message or blank screen to mask the reserved power. When the cellular telephone 100 is in an Emergency Power Reserve Mode, only emergency telephone calls or operations are permitted. The host controller 110 waits for the user to turn on the cellular telephone 100 or engage a specific physical interaction (e.g., pressing a designated button) at block 760. After the user has activated the emergency mode, the host controller 110 activates the power supply from the battery 120 to the emergency subsystem 300 at block 750 and provides a visual display of a user message such as "Emergency Power Reserve Mode" to alert the user that the cellular telephone 100 is in an Emergency Power Reserve Mode. Next, the host controller 110 provides a visual display asking the user whether they want to make an emergency call or perform another emergency operation as shown in FIG. 6B, at block 570. If the user does not want to proceed, the host controller 110 automatically shuts off the power supply from the battery 120 at block 780 and returns to the Emergency Power Reserve State at block 730. However, if the user desires to make an emergency call or perform an emergency operation at block 770, the host controller 110 enables the emergency subsystem 300 to automatically dial a pre-stored emergency number (such as E911) or execute the selected emergency operation (e.g., sending GPS coordinates, taking a screenshot, etc.) for the user as shown in FIG. 6C, at block 790.

More specifically, the operation of the battery reserve feature for emergency use according to an embodiment of the present invention will be explained hereinbelow, with reference to the system architecture in FIG. 1 and the flowchart in FIG. 3.

First, the battery detector 130 detects the power level (e.g., voltage or current) of the battery 120 and sends the battery power information Vd, representing the real-time battery level, to the host controller 110, as shown in FIG. 1. The key input unit 160, when keyed by a user, can vary, through the host controller 110, the power setting information VS and the alarm setting information stored in the memory 140, unless the power setting VS has been pre-set by a third party or the manufacturer, or is dynamically adjusted based on usage or external conditions in the alternative embodiments. When the battery power information Vd reaches the power setting VS, the masking module 195 signals a masked battery value indicating full depletion to the main operating system 200, prompting the main operating system 200 to shut down or disable all non-essential device functions, preventing access to the reserved battery power during regular operations, while essential components remain powered for emergency use. Upon triggering an emergency mode via user interaction, the host controller 110 enables access to the reserved battery power for emergency operations, allowing access to emergency functionalities using the reserved battery capacity. In interlocking with the setting of the power setting information VS, the time taken from the beginning of alarming to the stop of feed of battery power from the battery 120 into the main circuit 190 for regular operations is automatically set. The alarm setting information may be selected from continuous sounding of an alarm, intermittent sounding of an alarm, flashing of a light instead of sounding of the alarm, and the like.

At the outset, the case where sounding of an alarm through the speaker 172 has been selected as the alarm setting information will be explained. The host controller 110 reads out the power setting information VS from the memory 140, compares the power setting information VS with the battery power information Vd from the battery detector 130, as facilitated by the components in FIG. 1, and, when the power level (e.g., voltage or current) in the battery power information Vd indicating the detected power value is higher than the power level in the power setting information VS (that is, when the battery power information Vd is above the lowest usable voltage or current, e.g., 20% of the battery power of the battery 120), energizes the switch 180 so that the battery power is fed into the main circuit 190 for making regular telephone calls. In this case, the alarm is not sounded.

On the other hand, when the power level in the battery power information Vd indicating the detected power value is lower than or equal to the power level in the power setting information VS (that is, when the battery power information Vd reaches the lowest usable voltage or current, e.g., 20% of the battery power of the battery 120), the host controller 110 reads out the alarm setting information from the memory 140 and outputs the alarm sound signal based on the alarm setting information to sound an alarm through the speaker 172. At or about the same time, based on the power setting information VS (which may be dynamically adjusted based on external conditions or location), the masking module 195 signals a masked battery value indicating full depletion to the main operating system 200, causing the display unit 150 to display a "no power" message or a blank screen, giving the appearance that the phone is completely inoperable, while preserving the reserved power for emergency use. After sounding the alarm, the host controller 110 outputs a switch control signal S1 so that the switch 180 switches from the feed of battery power to the stop of the feed of battery power from the battery 120 to the main circuit 190 for regular operations, disabling all non-essential device functions and preventing access to the reserved battery power during regular operations.

Method and means for setting various types of information and alarming will be explained in more detail. Incorporation of the setting of the power setting information VS and the alarm setting information into software, as one of the functions of the cellular telephone 100, enables the user to vary the setting while watching a setting screen displayed on the display unit 150, unless the power setting VS is fixed by a third party or manufacturer, or dynamically adjusted in the alternative embodiments.

The value of the power setting information VS, which can be set by the user (or pre-set by a third party/manufacturer, or dynamically adjusted), may be, for example, an integer in any permissible range, and, upon input of the numerical value from the key input unit 160 (or pre-configured/dynamic setting), the numerical value is stored as the predefined reserve threshold in the memory 140. In the host controller 110, the power setting information VS set in the memory 140 is compared with the battery power information Vd indicating the real-time battery level of the battery 120. In the dynamic adjustment embodiment, the host controller 110 may periodically recalculate VS based on real-time data, such as temperature readings from an onboard sensor, weather data from a network connection, usage patterns (e.g., heavy call or data use), or location data indicating a remote or high-risk area, increasing VS to, for example, 25% or 30% if conditions warrant a larger reserve.

In another embodiment of setting, the user (or a third party/manufacturer, or dynamic system) may set information that the battery power alarm is sounded a certain number of minutes before the residual capacity of the battery 120 becomes zero (the battery becomes unusable for regular operations due to lowering of voltage or current). The time may be selected from 0 to 5 minutes in 1-minute increments. Additionally or alternatively, the increments may be varied in length. The time until the residual capacity of the battery 120 becomes zero can be estimated to some extent based on the battery power at that time, and may be further refined by factoring in environmental conditions or location-based risk assessments that adjust VS dynamically. In this embodiment of setting as well, the power setting information VS stored in the memory 140 is converted to a numerical value in the same permissible range, although the screen in the setting by the user may be displayed so that the time value is input, where user modification is permitted.

Next, regarding the alarm setting information, the user may select one option from the choices displayed on the screen. The choices include no alarm, alarm via the speaker 172 or via the buzzer 174, flashing of a lamp, and the like. In this case, for no alarm, the alarm for the residual capacity of the battery is not sounded at all; for alarm, the alarm for the residual capacity of the battery is sounded, for example, every 5 seconds or 10 seconds. For flashing of light, the call incoming lamp may be flashed instead of sounding the alarm.

Regarding the method for giving the alarm for the battery power to the user, playing of music, increase or decrease in the number of times of sounding, narrowing of sounding intervals, and the like may be mentioned in addition to the above-described no alarm, alarm, and flashing of light. During waiting, the alarm for the battery power is sounded through a speaker 172. Alternatively, during talking over the portable electronic device such as the cellular telephone, the alarm for the battery power is sounded through a receiver (not shown). When sounding the alarm through the speaker 172, the host controller 110 outputs an alarm sound signal to the speaker 172. Similarly, when sounding the alarm through the receiver (not shown), the host controller 110 outputs an alarm sound signal to the receiver (not shown). In the case of the lighting (or flashing) of light, the call incoming lamp may be lighted (or flashed) independently of whether the cellular telephone is in the state of waiting or talking.

The host controller 110 may be configured to allow the user to make an emergency call or perform other emergency operations when the cellular telephone 100 is turned on, any time after the battery 120 has reached the power setting VS and appears to have run out of power for purposes of making regular telephone calls. These emergency operations, enabled by the emergency subsystem 300, may include, but are not limited to, contacting 911 or pre-stored emergency numbers, sending GPS coordinates to designated emergency contacts, taking a screenshot of the phone display (e.g., to capture critical information), sending a pre-recorded distress message to emergency contacts, activating a loud alarm through the speaker 172 to attract attention from nearby individuals in a crisis, or launching a low-power communication protocol for emergency alerts. The emergency mode may be activated by a specific physical interaction, such as pressing a designated button, triggering an emergency mode and ensuring accessibility even when the device appears inoperable. Software diagrams of the host controller 110 having the battery reserve feature for emergency use are shown in FIGS. 3, 5, and 7. Examples of a cellular telephone 100 having the battery reserve feature for emergency use according to an embodiment of the present invention are shown in FIGS. 6A-6C.

As described from the foregoing, the battery reserve feature of the portable electronic device such as the cellular telephone according to an embodiment of the present invention advantageously allows the user to make an emergency call, such as E911 or any other pre-stored emergency number, or perform other critical emergency operations, even if the battery appears to have run down. As a result, the user is always provided with access to such a cellular telephone in cases of emergency regardless of the apparent condition of its battery.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the present invention is applicable to all types of portable electronic devices, including, but not limited to, analog and digital mobile or cellular phones, pagers, wireless portable digital assistants (PDAs), and other portable consumer electronics. More importantly, hardware equivalence may be implemented in lieu of a software-based battery reserve feature for emergency use. Further, many other modifications may be made to adapt the teachings of the present invention to a particular situation without departing from the scope of the appended claims.

What is claimed is:

1. A portable electronic device with a battery reserve feature for emergency use, comprising:
   a battery configured to provide power to the portable electronic device:
   a battery monitoring circuit coupled to the battery and configured to detect a power level of the battery and generate battery power information:
   a memory configured to store a power setting information VS, wherein the power setting information VS represents a threshold power level at which a portion of the battery power is reserved exclusively for emergency operations, and wherein the power setting information VS is pre-set by a third party or a manufacturer of the portable electronic device and stored as a fixed value inaccessible to modification by a user:
   a masking module configured to modify the battery power information transmitted to an operating system of the portable electronic device when the power level of the battery reaches the power setting information VS, to indicate full depletion of the battery while preserving the reserved portion of the battery power for the emergency operations;
   a host controller coupled to the battery monitoring circuit and the memory, the host controller configured to:
   compare the battery power information with the power setting information VS, disable regular operations of the portable electronic device when the battery power information reaches the power setting information VS, and
   enable emergency operations using the reserved portion of the battery power; and a main circuit coupled to the host controller and configured to execute the emergency operations, wherein the emergency operations include at least one of making an emergency call or performing an emergency action.

2. The portable electronic device of claim 1, further comprising a display unit configured to provide visual information to a user:
   wherein the host controller further causes the display unit to display a "no power" message or a blank screen when the battery power information reaches the power setting information VS, thereby indicating to the user that the portable electronic device is inoperable despite retaining the reserved portion of the battery power, and
   enable emergency operations using the reserved portion of the battery power when the portable electronic device is activated by the user after reaching the power setting information VS.

3. The device of claim 1, further comprising a key input unit configured to receive a specific physical interaction from the user to trigger the emergency operations, wherein the specific physical interaction includes pressing a designated button.

4. A portable electronic device with a battery reserve feature for emergency use, comprising:
   a battery configured to provide power to the portable electronic device:
   a battery monitoring circuit coupled to the battery and configured to detect a power level of the battery and generate battery power information;
   a memory configured to store a power setting information VS, wherein the power setting information VS represents a threshold power level at which a portion of the battery power is reserved exclusively for emergency operations:
   a host controller coupled to the battery monitoring circuit and the memory, the host controller configured to:
   dynamically adjust the power setting information VS based on at least one of usage patterns of the portable electronic device or external conditions, wherein the external conditions include environmental factors affecting battery life or a location-based risk assessment indicating a need for increased emergency power reserve,
   compare the battery power information with the dynamically adjusted power setting information VS,
   disable regular operations of the portable electronic device when the battery power information reaches the dynamically adjusted power setting information VS, and
   enable emergency operations using the reserved portion of the battery power; and a main circuit coupled to the host controller and configured to execute the emergency operations, wherein the emergency operations include at least one of making an emergency call or performing an emergency action.

5. The device of claim 4, wherein the location-based risk assessment is based on at least one of GPS data or network data indicating that the portable electronic device is in a remote or high-risk area.

6. A method for managing battery power in a portable electronic device, comprising:
   determining a real-time battery level:
   comparing the real-time battery level with a predefined reserve threshold: wherein the predefined reserve threshold is dynamically adjusted based on environmental factors including at least one of temperature or weather conditions affecting battery life masking the real-time battery level by transmitting a modified battery level value to the operating system when the reserve threshold is reached, wherein the modified battery level indicates depletion:

preventing access to the reserved battery power during regular operations; and enabling access to the reserved battery power for emergency operations upon triggering an emergency mode.

7. The method of claim 6, wherein the predefined reserve threshold is stored in a non-volatile memory and is not user-adjustable.

8. The method of claim 6, wherein the emergency mode is activated by a specific physical interaction with the device.

9. The method of claim 6, wherein the emergency operations comprise at least one of:

initiating a call to a preconfigured contact, transmitting geolocation data, or launching a low-power communication protocol.

10. The method of claim 6, wherein the operating system shuts down upon receiving the masked battery value indicating full depletion.

11. The method of claim 6, wherein the masking operation is performed at the firmware or bootloader level, independent of the operating system.

12. The method of claim 6, wherein the emergency operations further comprise capturing a screenshot of a display of the portable electronic device to record critical information.

13. A portable electronic device comprising:

a battery configured to supply electrical power:

a battery monitoring circuit configured to monitor a real battery level of the portable electronic device and transmit the real battery level to an operating system:

a non-transitory memory storing a predefined reserve threshold:

a controller configured to:

mask the real battery level from the operating system by signaling zero battery when the reserve threshold is reached, initiate an emergency mode upon a user request, and allow access to emergency functionalities using the reserved battery capacity.

14. The device of claim 13, wherein the controller is further configured to disable all non-essential device functions while emergency mode is active.

15. The device of claim 13, wherein the controller prevents the operating system from accessing the reserved battery capacity during standard operation.

16. The device of claim 13, wherein the emergency mode includes a dedicated micro-operating system or subsystem independent of the main operating system.

17. The device of claim 13, wherein the emergency functionalities include activating a loud alarm to attract attention from nearby individuals.

18. The device of claim 13, wherein the non-transitory memory is configured to store a set of preconfigured emergency contacts accessible only during the emergency mode.

19. The device of claim 13, wherein the portable electronic device is a cellular mobile phone.

* * * * *